US 011409012B2

(12) United States Patent
Bin Gubair et al.

(10) Patent No.: US 11,409,012 B2
(45) Date of Patent: Aug. 9, 2022

(54) FREQUENCY BASED METHOD FOR REDUCING THE EFFECT OF MULTIPLES IN SEISMIC DATA

(71) Applicant: Saudi Arabian Oil Company, Dhahran (SA)

(72) Inventors: Mohammed Saleh Bin Gubair, Dammam (SA); Maher Al Marhoon, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 413 days.

(21) Appl. No.: 16/658,815

(22) Filed: Oct. 21, 2019

(65) Prior Publication Data
US 2021/0116593 A1   Apr. 22, 2021

(51) Int. Cl.
  *G01V 1/30* (2006.01)
  *G01V 1/16* (2006.01)
  *G01V 1/18* (2006.01)

(52) U.S. Cl.
  CPC ............ *G01V 1/307* (2013.01); *G01V 1/162* (2013.01); *G01V 1/18* (2013.01); *G01V 2210/21* (2013.01)

(58) Field of Classification Search
  CPC .......... G01V 1/307; G01V 1/162; G01V 1/18; G01V 2210/21; G01V 2210/643; G01V 1/364
  See application file for complete search history.

(56) References Cited

U.S. PATENT DOCUMENTS

| 3,284,763 A | * | 11/1966 | Burg ................... G06E 3/001 324/76.13 |
| 3,731,268 A | | 5/1973 | Landrum, Jr. |
| 5,671,136 A | | 9/1997 | Willhoit, Jr. |
| 5,894,417 A | | 4/1999 | Dorn |

(Continued)

FOREIGN PATENT DOCUMENTS

| CN | 101545983 | 9/2009 |
| CN | 102819040 | 12/2012 |

(Continued)

OTHER PUBLICATIONS

Skidmore et al., "Avo helps seismic imaging in deepwater environments," Oil and Gas Journal, Nov. 1997, 95(44): 3 pages.

(Continued)

*Primary Examiner* — Mohammad K Islam
(74) *Attorney, Agent, or Firm* — Fish & Richardson P.C.

(57) ABSTRACT

Disclosed are methods, systems, and computer-readable medium to perform operations including: decomposing the seismic data into a plurality of sub-volumes, each sub-volume associated with a respective one of the plurality of frequency components; identifying a portion of the seismic data that includes one or more multiples, the multiples being seismic data associated with multiply reflected seismic energy; identifying, based on the plurality of sub-volumes, the one or more multiples within the portion of the seismic data; and determining, from the plurality of frequency components, a single frequency that gives rise to a predetermined continuity along a primary reflector affected by the one or more multiples.

16 Claims, 7 Drawing Sheets
(3 of 7 Drawing Sheet(s) Filed in Color)

(56) References Cited

U.S. PATENT DOCUMENTS

| | | | | |
|---|---|---|---|---|
| 5,986,973 | A * | 11/1999 | Jericevic | G01V 1/38 367/24 |
| 6,112,155 | A * | 8/2000 | Pham | G01V 1/364 702/14 |
| 6,131,071 | A | 10/2000 | Partyka | |
| 6,498,989 | B1 | 12/2002 | Pisetski et al. | |
| 6,507,787 | B1 * | 1/2003 | Filpo Ferreira Da Silva | G01V 1/36 702/14 |
| 6,678,617 | B2 * | 1/2004 | Khan | G01V 1/28 367/41 |
| 6,735,526 | B1 * | 5/2004 | Meldahl | G01V 1/28 702/14 |
| 6,832,161 | B1 * | 12/2004 | Moore | G01V 1/364 703/10 |
| 7,248,539 | B2 | 7/2007 | Gorgos et al. | |
| 7,398,158 | B2 | 7/2008 | Najmuddin | |
| 8,265,876 | B1 | 9/2012 | Yu et al. | |
| 8,849,574 | B2 | 9/2014 | Lomask | |
| 11,209,562 | B2 * | 12/2021 | Savels | G01V 1/364 |
| 2005/0125157 | A1 | 6/2005 | Toelle | |
| 2009/0292475 | A1 * | 11/2009 | Alam | G01V 1/34 702/14 |
| 2011/0002194 | A1 * | 1/2011 | Imhof | G01V 1/32 367/53 |
| 2011/0042098 | A1 * | 2/2011 | Imhof | G01V 1/30 166/369 |
| 2011/0048731 | A1 | 3/2011 | Imhof et al. | |
| 2011/0125406 | A1 * | 5/2011 | Nemeth | G01V 1/3808 702/14 |
| 2011/0153218 | A1 | 6/2011 | Peng | |
| 2011/0295510 | A1 * | 12/2011 | Gulati | G01V 1/288 345/419 |
| 2012/0039149 | A1 * | 2/2012 | van Borselen | G01V 1/362 367/24 |
| 2012/0041682 | A1 | 2/2012 | Ramirez-Perez et al. | |
| 2012/0253758 | A1 * | 10/2012 | Lazaratos | G01V 1/282 703/2 |
| 2014/0067273 | A1 | 3/2014 | Puryear et al. | |
| 2014/0200815 | A1 * | 7/2014 | Hung | G01V 1/36 702/16 |
| 2014/0247969 | A1 | 9/2014 | Srigiriraju | |
| 2014/0278117 | A1 * | 9/2014 | Dobin | G01V 1/345 702/16 |
| 2015/0185342 | A1 * | 7/2015 | van Groenestijn | G01V 1/364 702/14 |
| 2016/0209530 | A1 | 7/2016 | Nguyen et al. | |
| 2016/0356903 | A1 * | 12/2016 | Akcelik | G01V 1/38 |
| 2017/0160414 | A1 | 6/2017 | Sternfels et al. | |
| 2017/0219734 | A1 * | 8/2017 | Duval | G01V 1/364 |
| 2018/0024263 | A1 | 1/2018 | Aarre et al. | |
| 2018/0203147 | A1 | 7/2018 | Paffenholz et al. | |
| 2018/0306938 | A1 | 10/2018 | Gesbert et al. | |
| 2019/0227186 | A1 | 7/2019 | Gubair et al. | |
| 2020/0166664 | A1 | 5/2020 | Gubair et al. | |

FOREIGN PATENT DOCUMENTS

| | | |
|---|---|---|
| CN | 105093290 | 11/2015 |
| WO | WO2011109839 | 9/2011 |

OTHER PUBLICATIONS

PCT International Search Report and Written Opinion in International Appln. No. PCT/US2019/063060, dated Mar. 13, 2020, 15 pages.

GCC Examination Report in GCC Appln. No. GC 2019-38703, dated Apr. 29, 2021, 4 pages.

Alvarez, "Attenuation of Multiples in Image Space," Dissertation for Doctor of Philosophy, Department of Geophysics, Stanford University, Sep. 2007, 160 pages.

Avseth et al., "Quantitative seismic interpretation: Applying rock physics tools to reproduce interpretation risk; Chapter 4—Common techniques for quantitative seismic interpretation," Jun. 10, 2010, 45 pages.

Bancroft and Burt, "A Frequency Synthesis Technique Using Digital Controlled Division," presented at the 18th Annual Symposium on Frequency Control, Feb. 1964, 13 pages.

Butorin and Krasnov, "Approaches to the Analysis of Spectral Decomposition for the Purpose of Detailed Geological Interpretation," SPE-182079-MS, SPE Russian Petroleum Technology Conference and Exhibition, Oct. 24-26, 2016, 15 pages.

Cao "Analysis and Application of Radon Transform," MSC Thesis, Department of Geology and Geophysics, University of Calgary, Dec. 2006, 101 pages.

Chopra et al., "Enhancing interpretability of seismic data with spectral decomposition phase components," SEG Technical Program Expanded Abstracts 2015, Oct. 18-23, 2015, 5 pages.

Faraklioti and Petrou, "Horizon picking in 3D seismic data volumes," Machine Vision and Applications 15.4, Aug. 17, 2004, 4 pages.

Giroldi et al., "Using Spectral Decomposition to Identify and Characterize Glacial Valleys and Fluvial Channels within the Carboniferous Section in Bolivia," Section: Identification and Characterization; Channel Body Picking and Tracking, the Leading Edge, vol. 24, No. 11, Nov. 1, 2005, 7 pages.

Hardage, "Instantaneous Seismic Attribute Calculated by the Hilbert Transform," Search and Discovery Article #40563 on Jul. 17, 2010, 7 pages.

Herron, "Pitfalls in horizon autopicking," Interpretation 3.1, Feb. 1, 2015, 2 pages.

Honorio et al., "Interpreting Seismic Frequency Section Based on ICA," presented at the 75th EAGE conference and exhibition incorporating SPE Europe, London, Jun. 2013, 6 pages.

Hoyes and Cheret, "A review of 'global' interpretation methods for automated 3D horizon picking," The Leading Edge 30.1, Jan. 2011, 8 pages.

International Search Report and Written Opinion issued in International Application No. PCT/US2019/014136 dated Apr. 16, 2019, 14 pages.

Johann et al., "Spectral decomposition reveals geological hidden features in the amplitude maps from a deep water reservoir in the Campos Basin," SEG Technical Program Expanded Abstracts, Sep. 2003, 6 pages.

Montaigne, "Rational Virtualization Opens E&P Eyes," Hart's E&P, Landmark Technical Review 79, Oct. 2003, 2 pages.

Naseer et al., "Detection of cretaceous incised-valley shale for resource play, Miano gas field, SW Pakistan: Spectral decomposition using continuous wavelet transform," Journal of Asian Earth Sciences, vol. 147, Jul. 21, 2017, 20 pages.

Peacock et al, "Predictive Deconvolution: Theory and Practice," Geophysics, 34, 2, Apr. 1969, pp. 155-169.

Shi et al., "Prediction of Fluvial Sand Body Using the Technique of Frequency Division Interpretation," International Information and Engineering Technology Association, Environmental and Earth Sciences Research Journal, vol. 2, No. 2, 2015, 6 pages.

Verschuur et al, "Adaptive surface related multiple elimination," Geophysics, 57, 9, pp. 1166-1177, Sep. 1992.

Weglein et al, "Multiple Attenuation: Recent Advances and the Road Ahead", The Leading Edge, Aug. 2011, pp. 864-875.

Xiao et al, "Multiple suppression: A literature review," CREWES Research Report, vol. 15, 2003, 17 pages.

Yu et al., "Automatic horizon picking in 3D seismic data using optical filters and minimum spanning tree (patent pending)," SEG Technical Program Expanded Abstracts 2011, Jan. 2011, 5 pages.

Zeng, "Frequency-Dependent Seismic Stratigraphy for High-Resolution Interpretation of Depositional Sequences," adapted from an oral Presentation at AAPG Annual Convention and Exhibition, Jun. 7-10, 2009, Search and Discovery Article #40501, Apr. 5, 2010, 27 pages.

Zeng, "Strata slicing, part II: real 3-D seismic data," Geophysics, Society of Exploration Geophysicists, vol. 63, No. 2, Mar. 1, 1998, 9 pages.

(56) References Cited

OTHER PUBLICATIONS

Berkhout et al., "Transformation of multiples into primary reflections," SEG Technical Program Expanded Abstracts, Jan. 2003, 4 pages.
Ikwueto et al., "Advanced processing of multiples into useful seismic data for surface hydrocarbon oilfields," IOSR Journal of Applied Geology and Geophysics, Dec. 2014, 2(6):68-74.
PCT International Search Report and Written Opinion in International Appln. No. PCT/US2020/056626, dated Feb. 10, 2021, 17 pages.
GCC Examination Report in GCC Appln. No. GC 2020-40691, dated Oct. 13, 2021, 3 pages.
GCC Examination Report in GCC Appln. No. GC 2019-3 8703, dated Nov. 13, 2020, 4 pages.

\* cited by examiner

FREQUENCY BASED METHOD FOR REDUCING THE EFFECT OF MULTIPLES IN SEISMIC DATA

TECHNICAL FIELD

This disclosure relates to the interpretation of geological features based on frequency content of seismic data.

BACKGROUND

Seismic exploration of a subterranean formation involves generating controlled seismic signals that travel into the subterranean formation, gathering signals that are reflected back from the subterranean formation, and processing the reflected signals to yield information about the subterranean formation. The controlled seismic signals are generated using one or more seismic sources and the reflected signals are detected using one or more receivers. The sources and the receivers are disposed at or near the Earth's surface, in a body of water, or within boreholes. Each receiver can receive hundreds or thousands of reflected signals related to a down-going seismic signal (for example, an energy pulse or wave).

The reflected seismic signals can be categorized as "primary reflection" signals or "multiple reflection" signals. Primary reflection signals are once reflected seismic signals. That is, a down-going seismic signal undergoes a single reflection off a subsurface reflector before being captured by a receiver. Conversely, multiple reflection signals are multiply reflected seismic signals. That is, a down-going seismic signal undergoes one or more additional reflections after reflecting off a subsurface reflector before being captured by a receiver. Accordingly, multiple reflection signals do not take a direct path from the initial subsurface reflector to the receiver.

The reflected seismic signals can be processed to generate a seismic data volume indicative of the subterranean formation. Each primary reflection signal generates a seismic feature that is indicative of a corresponding subsurface reflector from which the signal was reflected. The seismic feature, which is referred to as a "primary reflector" or "primary," can be used to interpret the corresponding subsurface reflector. Each multiple reflection signal also generates a seismic feature (referred to as a "multiple") that is indicative of the subsurface reflector from which the signal was initially reflected. However, because a multiple reflection signal undergoes multiple reflections, the signal arrives at a receiver later in time than a primary reflection signal that was reflected off the same initial subsurface reflector. Therefore, the seismic feature generated by the multiple reflection signal is located in a different position in the seismic data volume than the primary of the same initial subsurface reflector. Because of the difference in position between a multiple and a primary of a subsurface reflector, the multiple cannot be easily associated with the subsurface reflector. Therefore, the multiple cannot be used to interpret the subsurface reflector. Not only that, but the multiple also obscures primaries (of other subsurface reflectors) that are located near the multiple in the seismic data volume.

SUMMARY

Disclosed is an approach that uses frequency content of seismic data to reduce the effect of multiples in the data. The described approach utilizes the finding that multiples have a different frequency than primaries that are near the multiples. The approach involves decomposing the seismic data to a number of mono-frequency sub-volumes. Subsequently, the sub-volumes are used to identify multiples in the seismic data and to reduce the effect of the multiples on the data.

Aspects of the subject matter described in this specification may be embodied in methods that include the actions of: decomposing the seismic data into a plurality of sub-volumes, each sub-volume associated with a respective one of the plurality of frequency components; identifying a portion of the seismic data that includes one or more multiples, the multiples being seismic data associated with multiply reflected seismic energy; identifying, based on the plurality of sub-volumes, the one or more multiples within the portion of the seismic data; and determining from the plurality of frequency components a single frequency that gives rise to a predetermined continuity along a primary reflector affected by the one or more multiples.

The previously described implementation is implementable using a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium. These and other embodiments may each optionally include one or more of the following features.

In a first aspect, interpreting the primary reflector using the sub-volume associated with the single frequency.

In a second aspect, where determining, from the plurality of frequency components, a single frequency that gives rise to a predetermined continuity along a primary reflector affected by the one or more multiples includes identifying, using the seismic data, a plurality of reflectors in the seismic data; determining, from of the plurality of reflectors, the primary reflector that is affected by the one or more multiples; and determining, using the plurality of sub-volumes, the single frequency that gives rise to the predetermined continuity along the primary reflector.

In a third aspect, where the predetermined continuity is a maximum continuity along the primary reflector.

In a fourth aspect, where determining, from the plurality of reflectors, the primary reflector that is affected by the one or more multiples includes receiving, based on the seismic data, a user's selection of the primary reflector.

In a fifth aspect, where the primary reflector that is affected by the one or more multiples has at least a threshold number of discontinuities.

In a sixth aspect, where identifying, using the seismic data, a plurality of reflectors in the seismic data includes performing horizon picking on the seismic data to generate the one or more seismic reflectors.

In a seventh aspect, where decomposing the seismic data into a plurality of sub-volumes includes using a plurality of narrow band filters to decompose the seismic data into the plurality of sub-volumes.

In an eighth aspect, where identifying, based on the plurality of sub-volumes, the one or more multiples within the portion of the seismic data includes analyzing the plurality of sub-volumes to detect at least one multiples indicator.

The subject matter described in this disclosure can be implemented to realize one or more of the following advantages. The described subject matter can accurately identify multiples in seismic data. Additionally, the described subject matter can reduce the effect of the identified multiples on the seismic data. The described subject matter also enables geoscientists to view primary data without the effect of multiples that are considered noise. Moreover, unlike existing multiples removal methods that are detrimental to primary data, the described methods do not have a detrimental effect on primary data. For example, existing methods affect the primary data when subtracting multiples. In comparison, the disclosed subject matter facilitates interpretation of seismic data without the detrimental effect of the multiples and without the negative effect of the subtraction process.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

Figure 1:
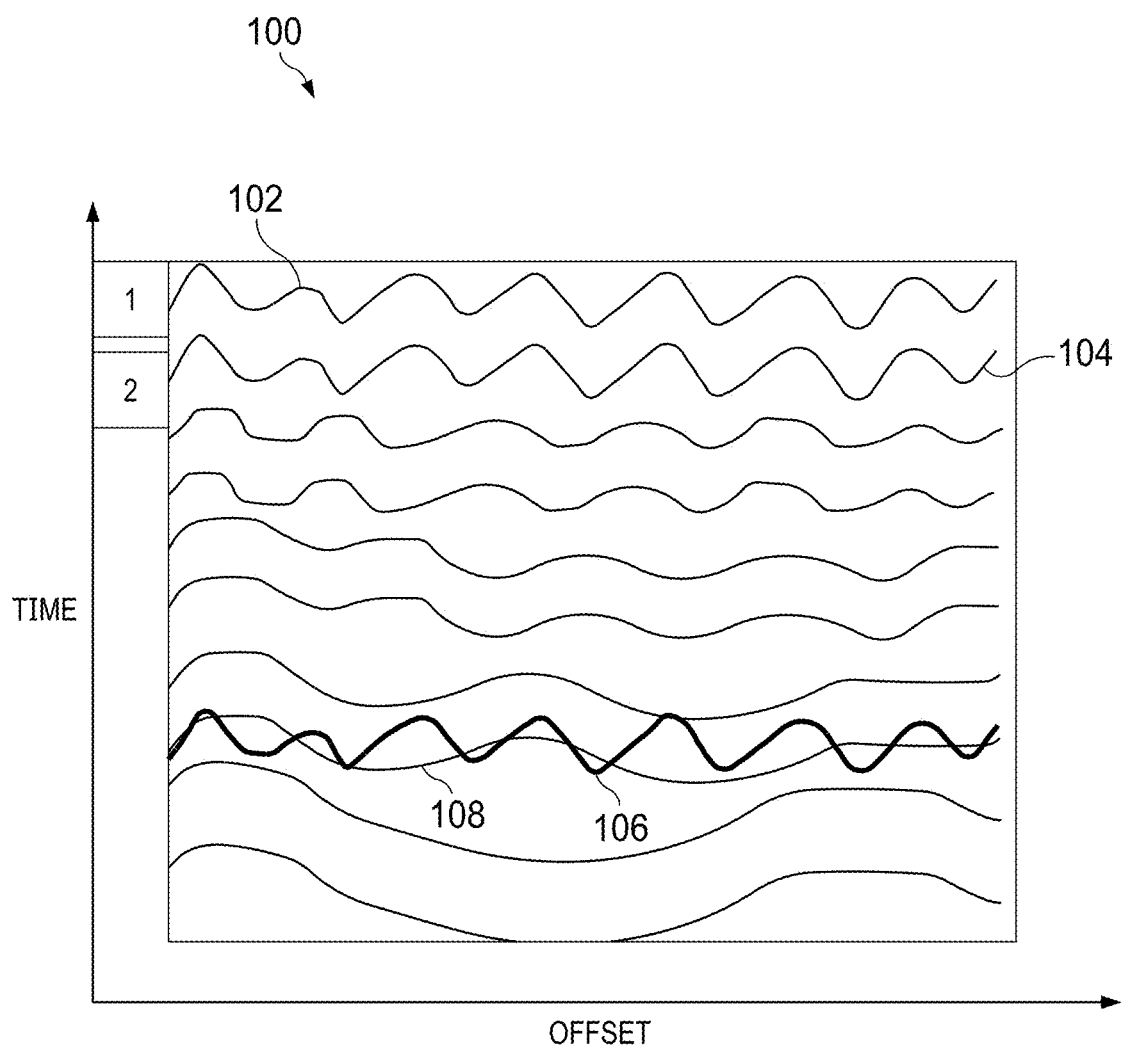
FIG. 1 illustrates a diagram of different horizons, according to some implementations of the present disclosure.

The following detailed description describes techniques for using frequency content of seismic data to reduce the effect of multiples in the data. Various modifications, alterations, and permutations of the disclosed implementations can be made and will be readily apparent to those of ordinary skill in the art. Furthermore, the general principles defined may be applied to other implementations and applications without departing from scope of the disclosure. In some instances, details unnecessary to obtain an understanding of the described subject matter may be omitted so as to not obscure one or more described implementations with unnecessary detail. The present disclosure is not intended to be limited to the described or illustrated implementations. Rather, the present disclosure is to be accorded the widest scope consistent with the described principles and features.

Multiples are noise that increase the difficulty of interpreting seismic data. For example, multiples increase the difficulty of horizon picking in seismic data. Horizons refer to surfaces or seismic reflectors that separate different rock layers in depositional environments. For example, a horizon can be a boundary between two different geological layers in a subterranean formation. Horizon picking or tracking refers to a process of identifying or determining a seismic reflector between two geological layers. Because multiples obscure primaries near the multiples (for example, surrounding the multiples), multiples make it more difficult to pick or track horizons associated with the obscured primaries.

Given that multiples increase the difficulty of interpreting seismic data, it would be advantageous to reduce or remove the effect of multiples in seismic data. However, identifying multiples and reducing their effect is challenging because there are no easily identifiable differences between primaries and multiples. In practice, some mathematical workflows are used to reduce the effect of multiples in seismic data. However, these mathematical workflows do not do so effectively. For example, existing workflows may identify and remove the effect of some multiples. However, when doing so, the workflows detrimentally affect the primary energy and jeopardize the ability to do seismic amplitude analysis, which is instrumental for seismic reservoir characterization.

Disclosed is an approach that uses frequency content of seismic data to reduce the effect of multiples in the data. The described approach utilizes the finding that multiples have a different frequency than primaries that are near the multiples. In an embodiment, a full stack seismic volume is decomposed into a plurality of sub-volumes. Each sub-volume includes a single frequency (that is, each sub-volume is a mono-frequency sub-volume). A region that includes one or more multiples is identified in the full stack seismic volume. The plurality of sub-volumes are used to identify the one or more multiples. Then, a single frequency that gives rise to a predetermined continuity along a primary affected by the one or more multiples is determined. The primary is interpreted using a sub-volume that is associated with the single frequency. Because of the difference in frequency between the one or more multiples and the primary, the effect of the one or more multiples is reduced in the sub-volume associated with the single frequency. Therefore, the primary can be better interpreted using the sub-volume than using the full stack seismic volume.

FIG. 1 illustrates a diagram 100 of horizons, according to some implementations. The diagram 100 is a cross-sectional view of horizons that are picked using seismic data of a subterranean formation. The seismic data includes frequency content over a range of frequencies, such as from 8 Hertz (Hz) to 80 Hz. The frequency content holds information indicative of different geological features, such as, channels and geological bodies. For example, different geological features can be seen at different frequencies due to multiple factors (for example, size and thickness) of the geological features. It has been found that the frequency of seismic data attenuates with increasing depth. Additionally, it has been found that a multiple has a similar frequency to a primary associated with the initial subsurface reflector from which the multiple was initially reflected. Because a multiple reflections signal is delayed, a multiple appears near primaries that are associated with subsurface reflectors that are beneath the initial subsurface reflector of the multiple. Based on these findings, it has been determined that there is a difference in frequency between multiples and primaries that are near the multiples in the seismic data. Because a multiple is associated with the subsurface reflector that is higher in depth than the subsurface reflectors of nearby primaries, the multiple has a higher frequency than the nearby primaries.

As shown in FIG. 1, the subterranean formation includes horizons 102, 104, 106, and 108. The horizons in blue, such as horizons 102, 104, and 108, are primary horizons or primaries. These horizons are picked using seismic data generated by primary reflection signals. Horizon 106, in red, is a multiple horizon or multiple. In this example, the horizon 106 is a multiple of the primary horizon 104. Because the multiple reflection signal undergoes multiple reflections, the signal arrives at a receiver later in time than the primary reflection signal associated with the primary horizon 104. Therefore, as shown in FIG. 1, horizon 106 appears later in time than the primary horizon 104. As also shown in FIG. 1, horizon 106 obscures horizon 108 (that is, the horizon associated with the primary reflection signal received near the time at which the multiple reflection signal is received).

In line with the discussed findings, the seismic data associated with the horizon 102 has a wider bandwidth than the seismic data associated with the horizon 108. In other words, the seismic data associated with horizon 102 includes higher frequency components than the seismic data associated with horizon 108. For example, the seismic data of horizon 102 includes frequency components at 40 Hz, whereas the seismic data of horizon 108 includes components up to 15 Hz. Furthermore, because horizon 106 is a multiple of horizon 104, the seismic data of horizon 106 has a similar or identical frequency to the seismic data of horizon 104. The approach described in this disclosure can be used to identify and reduce the effect of multiple horizon 106 on primary horizon 108. Specifically, the approach utilizes the finding that the seismic data of horizon 106 has higher frequency components than the seismic data of nearby primaries (for example, primary horizon 108).

Figure 2:
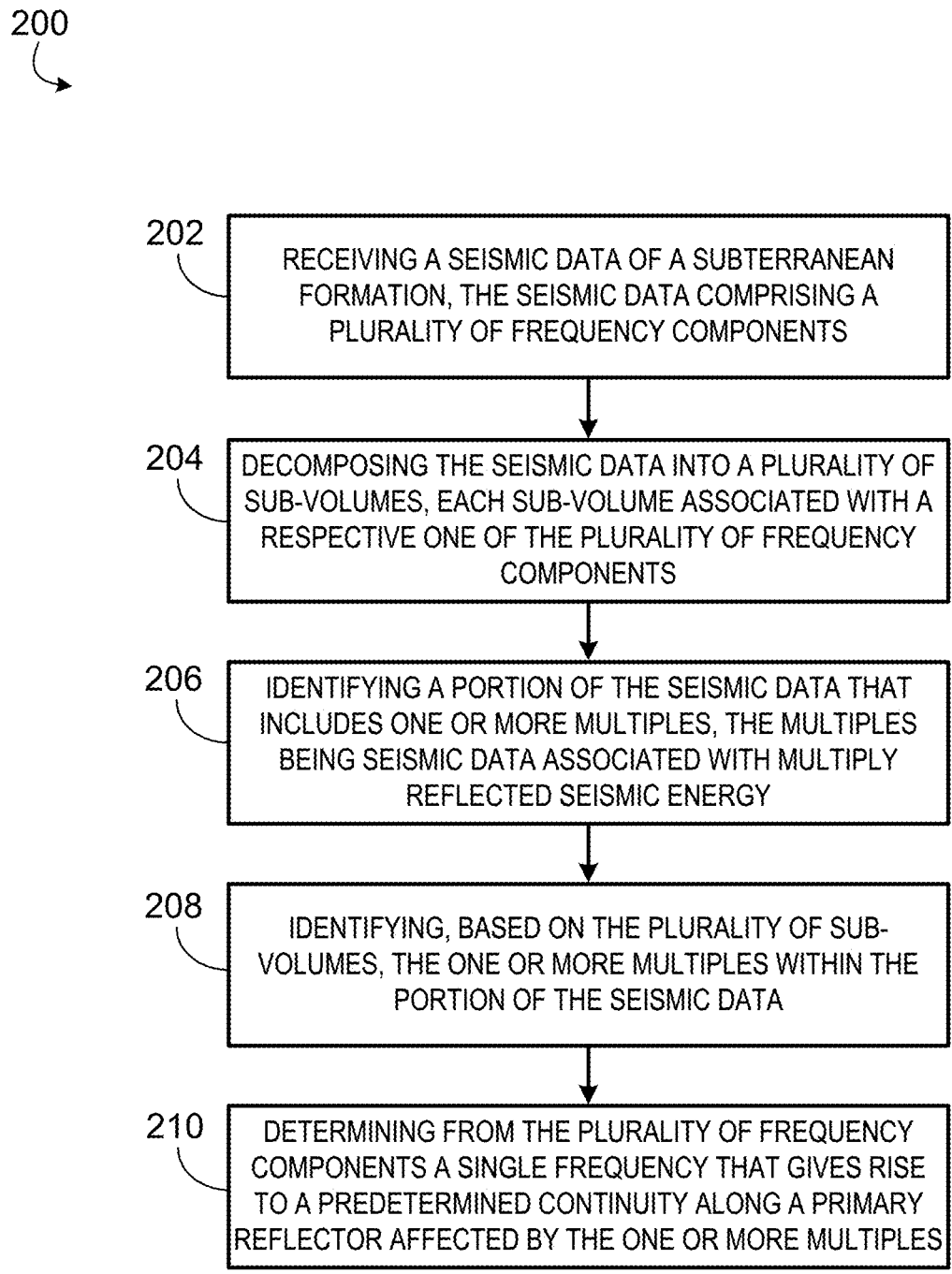
FIG. 2 illustrates a flowchart of an example method for using frequency content of seismic data to reduce the effect of multiples in the data, according to some implementations of the present disclosure.

FIG. 2 is a flowchart illustrating an example method 200 for using frequency content of seismic data to reduce the effect of multiples in the data, according to some implementations. For clarity of presentation, the description that follows generally describes method 200 in the context of the other figures in this description. For example, method 200 can be performed by a computer system described in FIG. 5. However, it will be understood that method 200 may be performed, for example, by any suitable system, environment, software, and hardware, or a combination of systems, environments, software, and hardware, as appropriate. In some implementations, various steps of method 200 can be run in parallel, in combination, in loops, or in any order.

Method 200 starts at step 202. At step 202, method 200 involves receiving seismic data of a subterranean formation. In an implementation, the seismic data is a three-dimensional (3D) seismic data volume obtained through a geophysical exploration of the subterranean formation. The 3D seismic data volume can be a full stack volume that includes a range of frequencies, for example, from 8 Hz to 80 Hz. The geophysical exploration, as described below in FIG. 4, involves using a seismic wave source to generate seismic waves that are transmitted into the subterranean formation. Each wave can be reflected by one or more subsurface reflectors and detected by one or more seismic receivers (for example, geophones) that record seismic waves. The reflected seismic signals can be primary reflection signals or multiple reflection signals.

At step 204, method 200 involves decomposing the seismic data into a plurality of sub-volumes, where each sub-volume is a mono-frequency volume that includes a respective single frequency. In an implementation, the respective frequencies of the sub-volumes are predetermined. In an example, it is predetermined that the respective frequencies of the sub-volumes range from 10 Hz to 70 Hz in 10 Hz increments. In this example, the seismic data is decomposed into seven sub-volumes, where the respective frequencies of the sub-volumes are 10 Hz, 20 Hz, 30 Hz, 40 Hz, 50 Hz, 60 Hz, and 70 Hz. Other predetermined frequency ranges and increments are also possible. In an implementation, decomposing the seismic data into the plurality of sub-volumes is performed using narrow-band filters, such as a "Ricker" filter. Specifically, the seismic data is passed through a respective narrow-band filter to produce each desired sub-volume. For example, to produce a 30 Hz sub-volume, the seismic data is passed through a 30 Hz narrow-band filter.

At step 206, method 200 involves identifying a portion of the seismic data that includes one or more multiples. As described previously, multiples are seismic events that are associated with multiply reflected seismic signals. In an implementation, the portion of the seismic data that includes the multiples is identified by examining a respective continuity of one or more horizons in the data. In an example, a horizon that has a threshold number of discontinuities is indicative of an area of the seismic data that includes multiples. Such a horizon is referred to as an obscured horizon. Examining the respective continuity of the horizons can be performed manually by a user or automatically by the computing system. In order to examine the continuity of the horizons, step 206 may also involve picking one or more horizons in the seismic data. Picking horizons in the seismic data can be performed manually by a user or automatically by a computing system.

As an example of manual horizon picking, the computing system can render a graphic user interface (GUI) on a display device for displaying an image of the seismic data (for example, a seismic section). The user can view the image and select a horizon through user interaction with the image of the seismic data. For example, the user's selection of a horizon can include the user's click, touch, gesture, or placement of a cursor or any other user interaction with the image through the GUI. In some implementations, the user's selection of a horizon can include a text input of coordinates of an area of interest in the seismic data. In some implementations, a horizon can be selected by displaying well data on the seismic section and correlating the seismic reflector with layer tops in the well data. For example, during a drilling process of a well, formation tops can be identified based on factors, such as cuttings collected at the well locations, wireline logs, and regional geological studies. The formation tops indicate the beginning of geological layers or bodies. The formation tops are equivalent to the seismic horizons but only at the well location. In some implementations, the wireline logs of the wells and the identified formation tops on the wells are correlated with a seismic section (one of the seismic lines from the seismic volume that passes through or near the well location). Then, a seismic horizon can be correlated to the formation tops, for example, based on geology to map each seismic reflector to a geological body or feature. Then, the horizon can be identified or picked manually by the user or automatically by the computing system. In some implementations, a horizon can be a point, a line segment, or an area that is a part of the ultimately identified horizon, or approximate to the ultimately identified horizon.

As an example of automatic horizon picking, the computing system executing an auto-picker (for example, a 2D or a 3D auto-picker) can automatically identify multiple points in different locations near or along a horizon to form an automatically picked horizon. In some implementations, the auto-picker performs an auto-picking algorithm (for example, an optimization algorithm) for horizon picking. The auto-picking algorithm can receive a specific location of a seismic trace (for example, a location of a horizon selected by the user based on the coordinates of the seismic trace) as an input, and search for the same or similar features in the adjacent seismic traces. The adjacent seismic traces with the same or similar features can be identified, collected, and then output by the auto-picking algorithm as the picked horizon. In some instances, the features are not exactly the same along the actual horizon due to noise or multiples. As such, the auto-picking algorithm may not be able to pick a location along the actual horizon or may pick a location in the trace that is not geologically correct. In the case of a 3D auto-picker, the data processing apparatus executing the 3D auto-picking algorithm can identify a horizon as a 3D surface. In some implementations, the 3D auto-picker can reuse the functionalities of the 2D auto-picker. For example, the 3D auto-picker can perform the 2D auto-picking algorithm to identify a 2D horizon for each 2D seismic line in the 3D seismic volume. The multiple identified 2D horizons for the multiple 2D seismic lines in the 3D seismic volume can form a 3D horizon surface and return 3D horizon surface as the identified 3D horizon picked by the 3D auto-picker. In some implementations, the identified 3D horizon can be displayed through the GUI for further error checking and fixing, for example, by the user.

Once the horizons in the seismic data are picked, the obscured horizon is identified. In an implementation, the obscured horizon can be identified by the computing system. In an example, the computing system identifies an obscured horizon by receiving, determining, or otherwise identifying a selection of the obscured horizon. The selection of the obscured horizon can be performed manually by a user (for example, a seismic data interpreter) or automatically by the computing system. The selection can depend on many factors, such as a number of discontinuities in the horizon. In an example, identifying the obscured horizon based on the seismic data can include receiving a user's selection of the obscured horizon based on the seismic data.

At step 208, method 200 involves identifying, based on the plurality of sub-volumes, the one or more multiples within the portion of the seismic data. In an implementation, a multiple is identified by analyzing each of the plurality of sub-volumes. As explained previously, a multiple has a higher frequency than primary reflectors that are near the multiple. Therefore, sub-volumes with higher frequencies (that is, frequencies higher than the frequencies of the surrounding primary reflectors) include the multiple but not the surrounding primary reflectors. Conversely, sub-volumes with lower frequencies (that is, frequencies lower than the frequency of the multiple) include the surrounding primary reflectors but not the multiple. Accordingly, the multiple can be identified by comparing the plurality of sub-volumes and detecting seismic data that appears at higher frequencies but not at lower frequencies in the portion of seismic data. Note that identifying the multiples is performed in the time domain.

As an example of automatically identifying multiples, the computing system can automatically analyze the seismic volumes to detect an indicator of a multiple. For example, one indicator of multiples is seismic events crossing each other (for example, conflicting horizons) across seismic volumes. Once the indicators of multiples are detected, the computing system performs the automatic horizon picking workflow described above. In some implementations, the identified multiple horizon can be displayed through the GUI for further error checking and fixing, for example, by the user.

At step 210, method 200 involves determining, from the plurality of frequency components, a single frequency that gives rise to a predetermined continuity along a primary horizon affected by the one or more multiples. In an implementation, once the one or more multiples are identified, one or more primaries affected by the one or more multiples are also identified. For example, the obscured horizon is a horizon that is affected by a multiple.

In an implementation, the single frequency that gives rise to the predetermined continuity along the primary reflector is determined based on empirical knowledge, past experiments, or a search among different frequencies within the frequency bandwidth of the seismic data. In another implementation, the single frequency is determined automatically by the computing system. For example, in determining the single frequency, the computing system analyzes the plurality of sub-volumes to determine in which one of the sub-volumes the obscured horizon has a predetermined continuity. The frequency of the sub-volume in which the obscured horizon has a predetermined continuity is selected as the single frequency. In some implementations, the horizon that has the predetermined continuity along the obscured horizon includes a horizon that has a maximum continuity along the obscured horizon among the horizons in the plurality of mono-frequency sub-volumes. In some implementations, the horizon that has the predetermined continuity along the obscured horizon includes a horizon that has a continuity along the obscured horizon exceeding a predetermined threshold. Additional or different criteria can be defined for the horizon that has the predetermined continuity along the obscured horizon.

As an example of the search-based method for determining the single frequency, consider the seismic data with a frequency bandwidth ranging from 10 Hz to 70 Hz. A search step of 5 Hz, 10 Hz, or similar values can be used by the computing system to find the single frequency that gives rise to the predetermined continuity along the obscured horizon. As described previously, the computing system can decompose the seismic data into mono-frequencies, assess the horizon continuity level at each frequency, and select the frequency that gives rise to the predetermined continuity.

In an embodiment, the single frequency that is selected is the frequency associated with the primary horizon that is obscured by the multiples. This frequency is lower than the frequency of the multiple. This is due to frequency attenuating with depth. Thus, if the frequency of the multiple is, for example, 30 Hz, the frequency of the primary horizon near the multiple will be lower, for example, 15 Hz. In this example, the single frequency that is selected is the frequency of the primary horizon, 15 Hz. Accordingly, the 15 Hz sub-volume is selected to interpret the primary horizon. In this sub-volume, the effect of the 30 Hz multiple is reduced or removed.

The example method 200 shown in FIG. 2 can be modified or reconfigured to include additional, fewer, or different steps (not shown in FIG. 2), which can be performed in the order shown or in a different order. For example, after block 210, the primary horizon can be displayed in a map view for geological feature interpretation. In some implementations, the seismic horizons can be displayed in a cross-sectional view for geological feature interpretation. In some implementations, the displayed map view (or the displayed cross-sectional view) of the horizons can be used to locate potential areas for drilling or to identify lateral extent of a reservoir or a subsurface geological body/feature. In some implementations, one or more of the steps shown in FIG. 2 can be repeated or reiterated, for example, until a terminating condition is reached. In some implementations, one or more of the individual steps shown in FIG. 2 can be executed as multiple separate steps, or one or more subsets of the steps shown in FIG. 2 can be combined and executed as a single step. In some implementations, one or more of the individual steps shown in FIG. 2 may also be omitted from the example method 200.

Figure 3A:
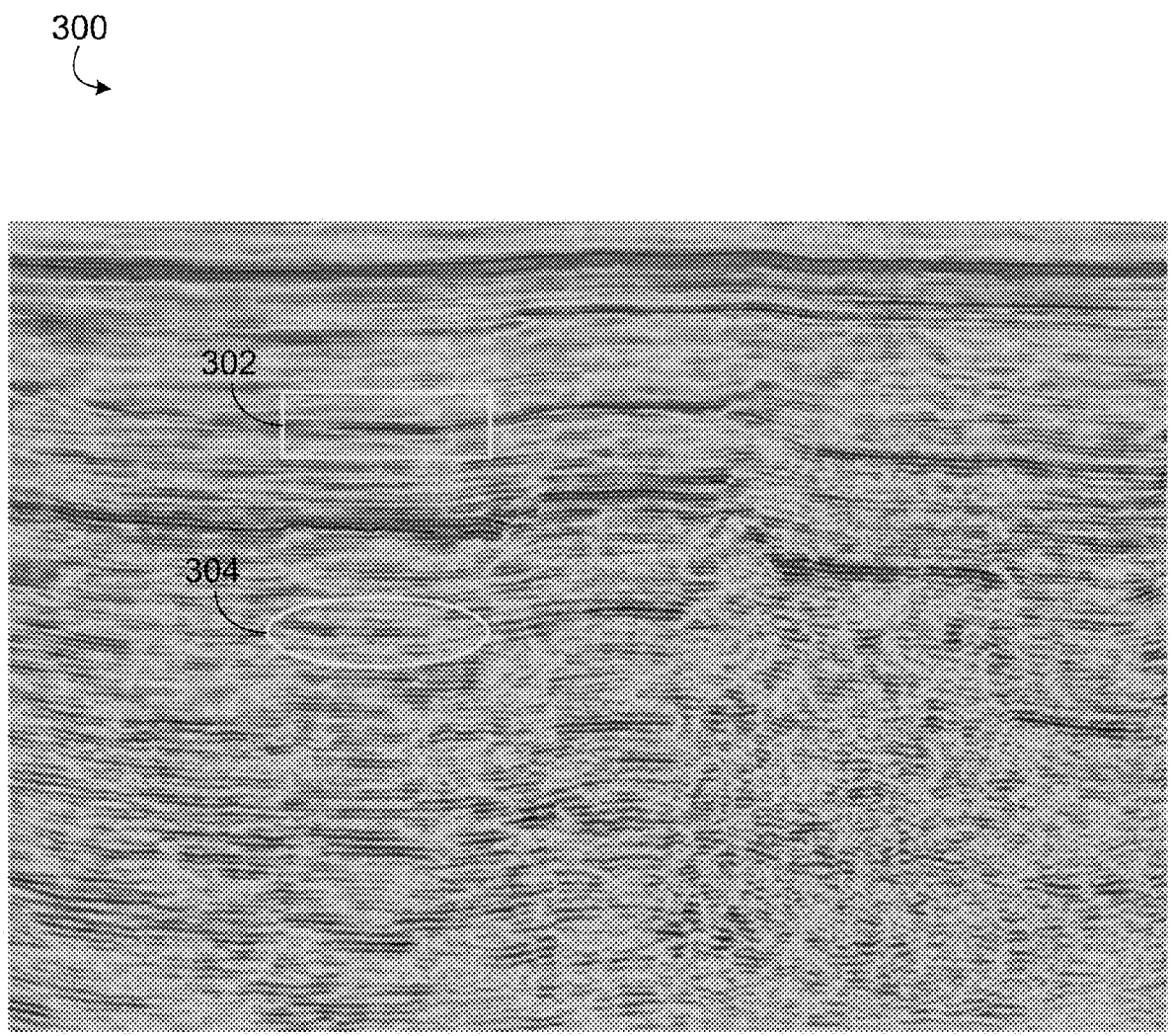
FIG. 3A illustrates a seismic section that includes multiples, according to some implementations of the present disclosure.

FIG. 3A illustrates a seismic section 300 that includes a multiple, according to some implementations. In FIG. 3A, a portion of the seismic section 300 that includes the multiple is annotated by circle 304. The portion that includes the multiple can be identified using any one of the methods described in this disclosure. Furthermore, in FIG. 3A, a rectangle 302 indicates a primary horizon that generated the multiple (that is, the primary of the subsurface reflector from which the multiple was initially reflected). As shown in FIG. 3A, the multiple occurs later in time (and position) than the corresponding primary. Furthermore, as also shown in FIG. 3A, the multiple obscures primaries that are located near the multiple (for example, within the area of circle 304).

Figure 3B:
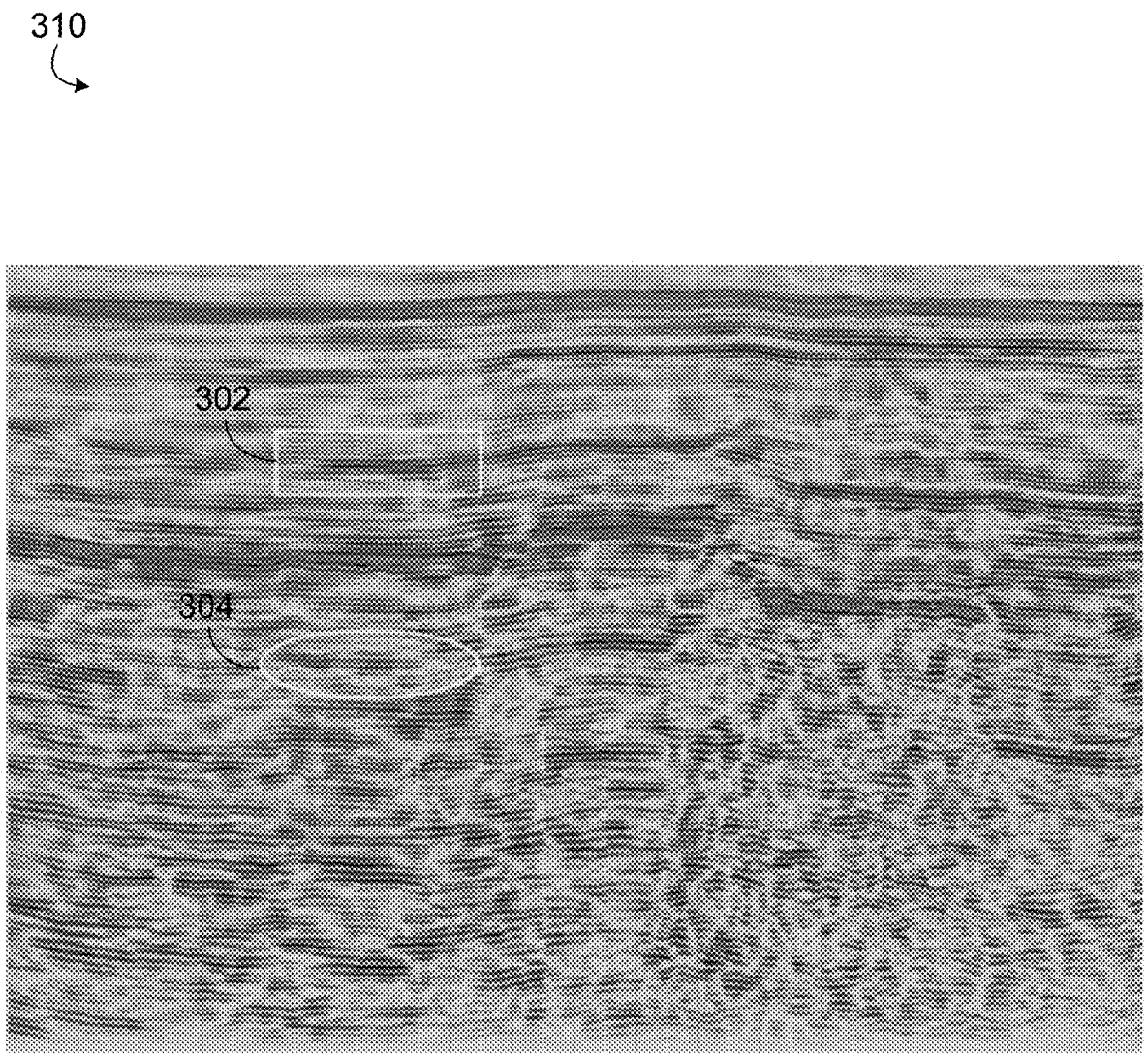
FIG. 3B illustrates the seismic section of FIG. 3A filtered to a first mono-frequency, according to some implementations of the present disclosure.

FIG. 3B illustrates a seismic section 310 filtered to a first mono-frequency, according to some implementations. In this example, the first mono-frequency is 30 Hz. As shown in FIG. 3B, the multiple within circle 304 is more clearly pronounced than in FIG. 3A. The multiple is identified by a crossing reflectors feature. That is, the multiple appears to cross one or more nearby primary reflectors, thereby causing discontinuities in the reflectors.

Figure 3C:
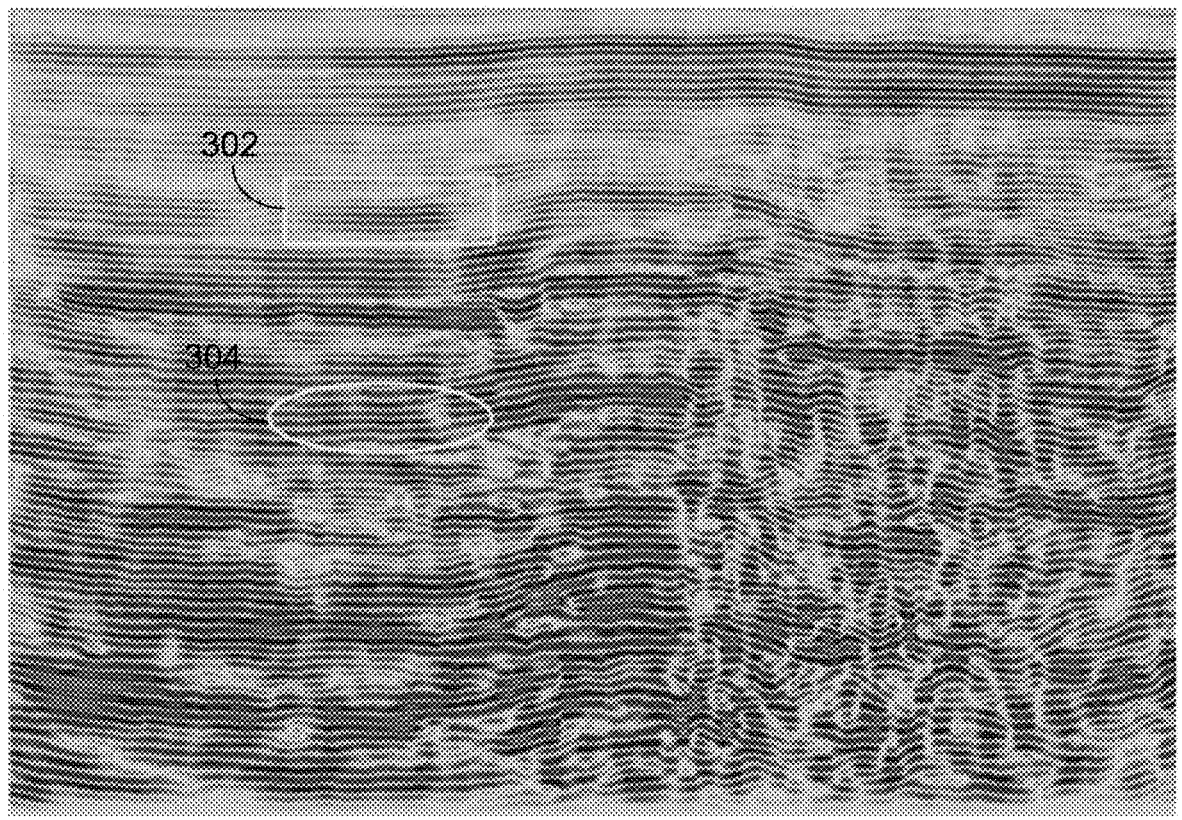
FIG. 3C illustrates the seismic section of FIG. 3A filtered to a second mono-frequency, according to some implementations of the present disclosure.

FIG. 3C illustrates a seismic section 320 filtered to a second mono-frequency, according to some implementations. In this example, the second mono-frequency is 15 Hz. As shown in FIG. 3C, the primary within circle 304 is more clearly pronounced than in FIG. 3A. That is, the effect of the multiple on the primary is decreased. Therefore, the primary within circle 304 can be better interpreted using the sub-volume associated with the second mono-frequency than using the full stack seismic volume.

Figure 4:
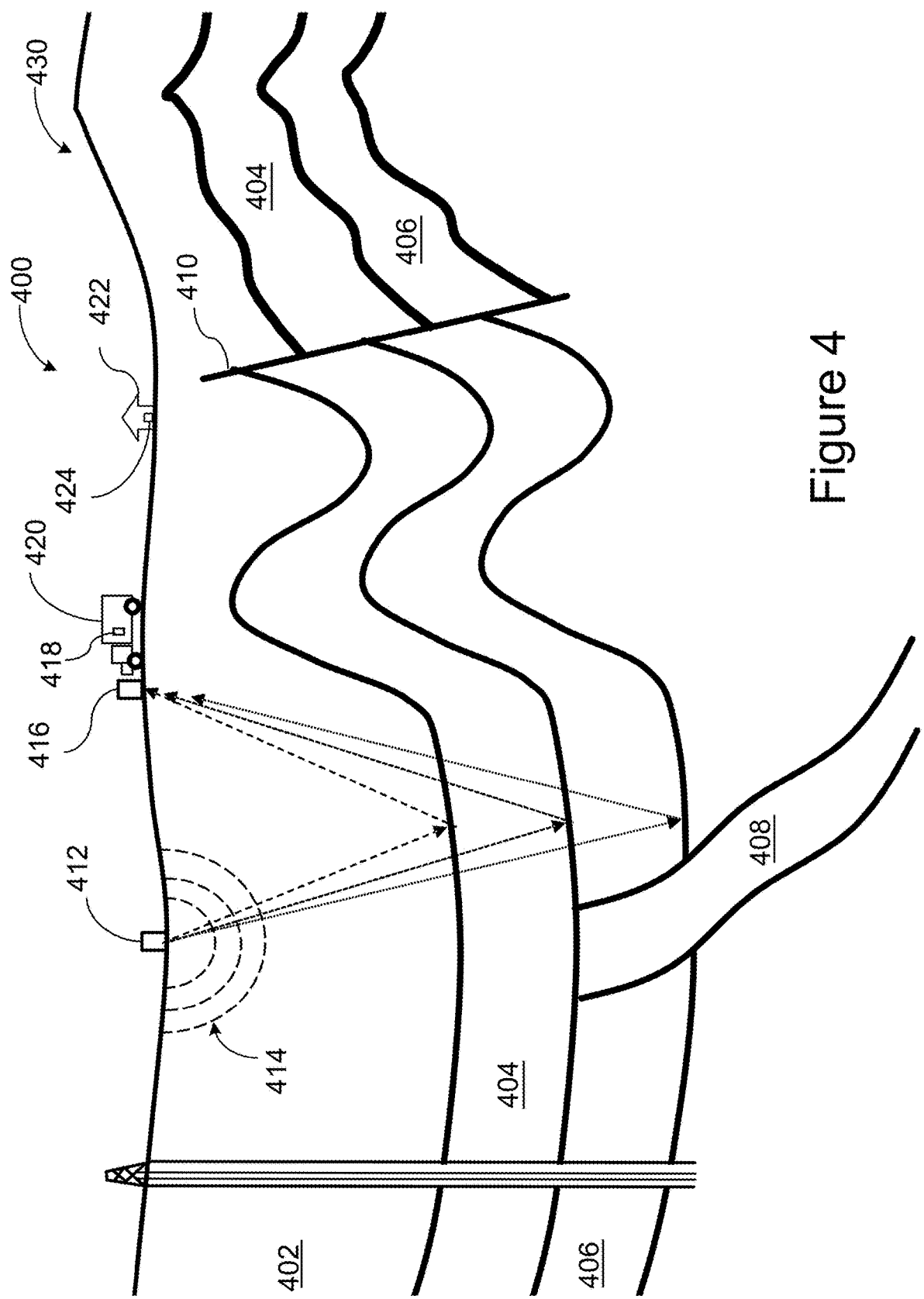
FIG. 4 illustrates an example seismic survey, according to some implementations of the present disclosure.

FIG. 4 is a schematic view of a seismic survey 400 being performed to map subterranean features such as facies and faults in a subterranean formation 430. The subterranean formation 430 includes a layer of impermeable cap rocks 402 at the surface. Facies underlying the impermeable cap rocks 402 include a sandstone layer 404, a limestone layer 406, and a sand layer 408. A fault line 410 extends across the sandstone layer 404 and the limestone layer 406.

A seismic source 412 (for example, a seismic vibrator or an explosion) generates seismic waves 414 that propagate in the earth. The velocity of these seismic waves 414 depends on properties such as, for example, density, porosity, and fluid content of the medium through which the seismic waves 414 are traveling. Different geologic bodies or layers in the earth are distinguishable because the layers have different properties and, thus, different characteristic seismic velocities. For example, in the subterranean formation 430, the velocity of seismic waves 414 traveling through the subterranean formation 430 will be different in the sandstone layer 404, the limestone layer 406, and the sand layer 408. As the seismic waves 414 contact interfaces between geologic bodies or layers that have different velocities, the interface reflects some of the energy of the seismic waves 414 and refracts part of the energy of the seismic waves 414. Such interfaces are sometimes referred to as horizons.

The seismic waves 414 are received by a sensor or sensors 416. Although illustrated as a single component in FIG. 4, the sensor or sensors 416 are typically a line or an array of sensors 416 that generate an output signal in response to received seismic waves 414 including waves reflected by the horizons in the subterranean formation 430. The sensors 416 can be geophone-receivers that produce electrical output signals transmitted as input data, for example, to a computer 418 on a seismic control truck 420. Based on the input data, the computer 418 may generate a seismic data output such as, for example, a seismic two-way response time plot.

A control center 422 can be operatively coupled to the seismic control truck 420 and other data acquisition and wellsite systems. The control center 422 may have computer facilities for receiving, storing, processing, or analyzing data from the seismic control truck 420 and other data acquisition and wellsite systems. For example, computer systems 424 in the control center 422 can be configured to analyze, model, control, optimize, or perform management tasks of field operations associated with development and production of resources such as oil and gas from the subterranean formation 430. Alternatively, the computer systems 424 can be located in a different location than the control center 422. Some computer systems 424 are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer systems 424 may be displayed for user viewing using local or remote monitors or other display units. One approach to analyzing seismic data is to associate the data with portions of a seismic cube representing the subterranean formation 430. The seismic cube can also display results of the analysis of the seismic data associated with the seismic survey.

Figure 5:
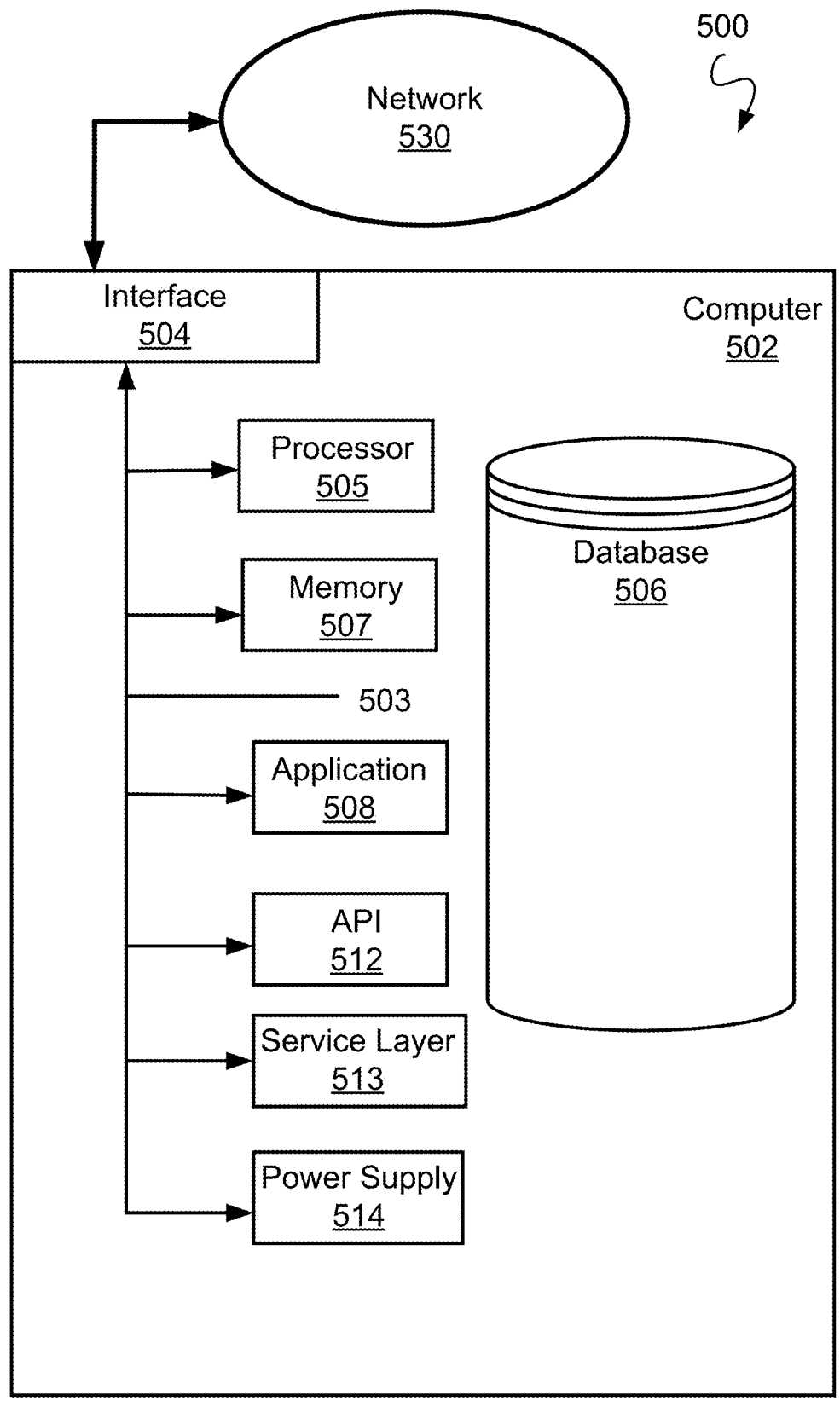
FIG. 5 illustrates a block diagram illustrating an example computer system used to provide computational functionalities associated with described algorithms, methods, functions, processes, flows, and procedures as described in the instant disclosure, according to some implementations of the present disclosure.

FIG. 5 is a block diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a high level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both), over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer 513. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or a combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems (for example, LINUX, UNIX, WINDOWS, MAC OS, ANDROID, or IOS).

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of the exchange file system can be done at the application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium

The invention claimed is:
1. A computer-implemented method comprising:
  receiving seismic data of a subterranean formation, the seismic data comprising a plurality of frequency components;
  decomposing, using a plurality of narrow band filters, the seismic data into a plurality of mono-frequency sub-volumes, each mono-frequency sub-volume associated with a respective one of the plurality of frequency components;
  identifying a portion of the seismic data that includes one or more multiples, the multiples being seismic data associated with multiply reflected seismic energy;
  identifying, based on the plurality of mono-frequency sub-volumes, the one or more multiples within the portion of the seismic data, wherein the one or more multiples affect a primary subterranean reflector represented by the portion of the seismic data; and determining, from the plurality of frequency components and based on the plurality of mono-frequency sub-volumes, a first frequency component that gives rise to a maximum continuity along the primary subterranean reflector compared to the other frequency components.

2. The computer-implemented method of claim 1, further comprising interpreting the primary reflector using the mono-frequency sub-volume associated with the first frequency component.

3. The computer-implemented method of claim 1, wherein determining, from the plurality of frequency components and based on the plurality of mono-frequency sub-volumes, a first frequency component that gives rise to the maximum a continuity along the primary reflector comprises:
    identifying, using the seismic data, a plurality of subterranean reflectors represented in the seismic data;
    determining, from of the plurality of subterranean reflectors, the primary subterranean reflector that is affected by the one or more multiples; and
    determining, using the plurality of mono-frequency sub-volumes, the first frequency component that gives rise to the maximum continuity along the primary subterranean reflector.

4. The computer-implemented method of claim 3, wherein determining, from the plurality of subterranean reflectors, the primary subterranean reflector that is affected by the one or more multiples comprises:
    receiving, based on the seismic data, a user's selection of the primary subterranean reflector.

5. The computer-implemented method of claim 1, wherein the primary subterranean reflector that is affected by the one or more multiples has at least a threshold number of discontinuities.

6. The method of claim 3, wherein identifying, using the seismic data, a plurality of subterranean reflectors represented in the seismic data comprises:
    performing horizon picking on the seismic data to generate the one or more seismic subterranean reflectors.

7. The method of claim 1, wherein identifying, based on the plurality of mono-frequency sub-volumes, the one or more multiples within the portion of the seismic data comprises:
    analyzing the plurality of mono-frequency sub-volumes to detect at least one multiples indicator.

8. A device comprising:
one or more processors; and
a non-transitory computer-readable storage medium coupled to the one or more processors and storing programming instructions for execution by the one or more processors, the programming instructions instructing the one or more processors to perform operations comprising:
    receiving seismic data of a subterranean formation, the seismic data comprising a plurality of frequency components;
    decomposing, using a plurality of narrow band filters, the seismic data into a plurality of mono-frequency sub-volumes, each mono-frequency sub-volume associated with a respective one of the plurality of frequency components;
    identifying a portion of the seismic data that includes one or more multiples, the multiples being seismic data associated with multiply reflected seismic energy;
    identifying, based on the plurality of mono-frequency sub-volumes, the one or more multiples within the portion of the seismic data, wherein the one or more multiples affect a primary subterranean reflector represented by the portion of the seismic data; and
    determining, from the plurality of frequency components and based on the plurality of mono-frequency sub-volumes, a first frequency component that gives rise to a maximum continuity along the primary subterranean reflector compared to the other frequency components.

9. The device of claim 8, further comprising interpreting the primary reflector using the mono-frequency sub-volume associated with the first frequency component.

10. The device of claim 8, wherein determining, from the plurality of frequency components and based on the plurality of mono-frequency sub-volumes, a first frequency component that gives rise to the maximum continuity along the primary reflector comprises:
    identifying, using the seismic data, a plurality of subterranean reflectors represented in the seismic data;
    determining, from of the plurality of subterranean reflectors, the primary subterranean reflector that is affected by the one or more multiples; and
    determining, using the plurality of mono-frequency sub-volumes, the first frequency component that gives rise to the maximum continuity along the primary subterranean reflector.

11. The device of claim 10, wherein determining, from the plurality of subterranean reflectors, the primary subterranean reflector that is affected by the one or more multiples comprises:
    receiving, based on the seismic data, a user's selection of the primary subterranean reflector.

12. The device of claim 10, wherein the primary subterranean reflector that is affected by the one or more multiples has at least a threshold number of discontinuities.

13. A non-transitory computer-readable medium storing instructions executable by a computer system to perform operations comprising:
    receiving seismic data of a subterranean formation, the seismic data comprising a plurality of frequency components;
    decomposing, using a plurality of narrow band filters, the seismic data into a plurality of mono-frequency sub-volumes, each mono-frequency sub-volume associated with a respective one of the plurality of frequency components;
    identifying a portion of the seismic data that includes one or more multiples, the multiples being seismic data associated with multiply reflected seismic energy;
    identifying, based on the plurality of mono-frequency sub-volumes, the one or more multiples within the portion of the seismic data, wherein the one or more multiples affect a primary subterranean reflector represented by the portion of the seismic data; and
    determining, from the plurality of frequency components and based on the plurality of mono-frequency sub-volumes, a first frequency component that gives rise to a maximum continuity along the primary subterranean reflector compared to the other frequency components.

14. The non-transitory computer-readable medium of claim 13, further comprising interpreting the primary reflector using the mono-frequency sub-volume associated with the first frequency component.

15. The non-transitory computer-readable medium of claim 13, wherein determining, from the plurality of frequency components and based on the plurality of mono-frequency sub-volumes, a first frequency component that gives rise to the maximum continuity along the primary reflector comprises:
- identifying, using the seismic data, a plurality of subterranean reflectors represented in the seismic data;
- determining, from of the plurality of subterranean reflectors, the primary subterranean reflector that is affected by the one or more multiples; and
- determining, using the plurality of mono-frequency sub-volumes, the first frequency component that gives rise to the maximum continuity along the primary subterranean reflector.

16. The non-transitory computer-readable medium of claim 15, wherein determining, from the plurality of subterranean reflectors, the primary subterranean reflector that is affected by the one or more multiples comprises:
- receiving, based on the seismic data, a user's selection of the primary subterranean reflector.

\* \* \* \* \*